United States Patent [19]
Boirat et al.

[11] 3,770,591
[45] Nov. 6, 1973

[54] INCUBATOR

[75] Inventors: Robert Boirat, Chilly-Mazarin; Jean Buissiere, Villeurbanne, both of France

[73] Assignee: Compagnie Generale D'Automatisme, Paris, France

[22] Filed: July 8, 1971

[21] Appl. No.: 160,640

[30] Foreign Application Priority Data
July 8, 1970 France .............................. 7025329

[52] U.S. Cl. ................................. 195/139, 195/127
[51] Int. Cl. ............................................. C12b 1/00
[58] Field of Search ........................... 195/127, 139; 312/236; 165/26, 30, 65, 53, 54, 56

[56] References Cited
UNITED STATES PATENTS
3,535,208 10/1970 Sasaki et al. ..................... 195/139 X
2,767,118 10/1956 Gaymont ............................. 195/96

*Primary Examiner*—Alvin E. Tanenholtz
*Assistant Examiner*—R. B. Penland
*Attorney*—Richard C. Sughrue et al.

[57] ABSTRACT

An incubator for the development of reactions in solutions during their heat treatment is characterized by the fact that the two horizontal linings are formed by heating plates, the upper plate being held at a regulated temperature and the lower plate at a temperature lower than the regulated temperature.

14 Claims, 3 Drawing Figures

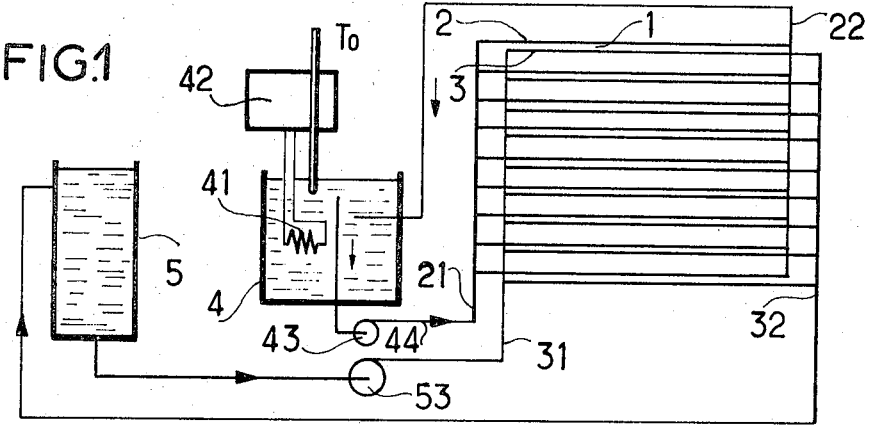
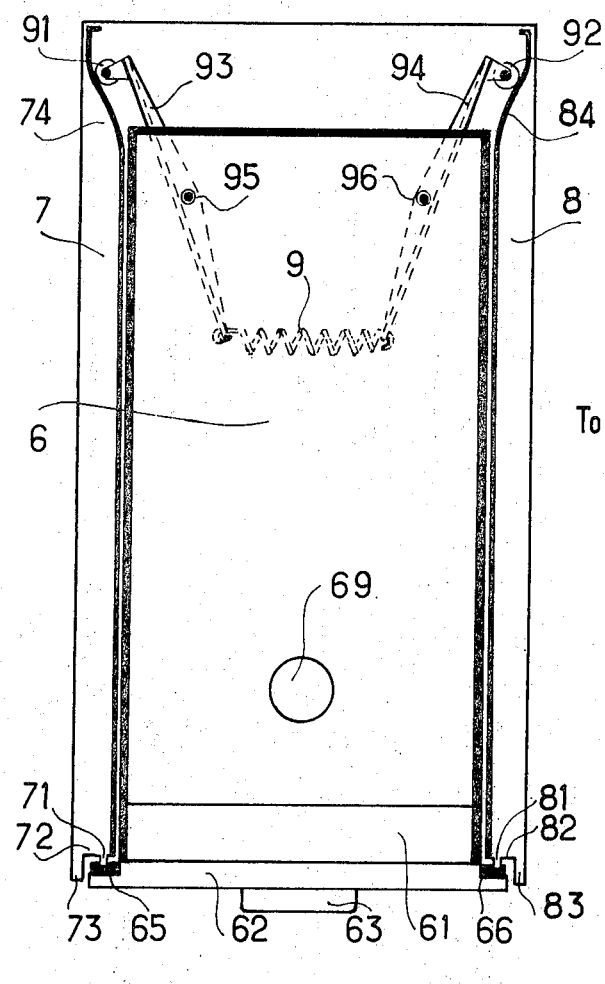
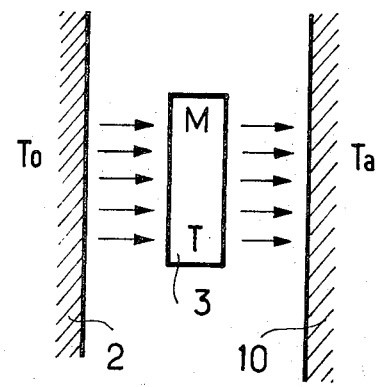

INCUBATOR

BACKGROUND OF THE INVENTION

1. Field of the Invention

The present invention concerns an incubator suitable for heat treatment of suspensions of bacteria in the presence of chemical reagents.

2. Description of the Prior Art

Such an incubator usually consists of thermostatically controlled chambers in which the development of reactions between the suspensions of bacteria and the chemical reagents is effected.

It has been proposed to use a device in the form of transparent plates including a plurality of cells allowing the rapid and automatic injection of suspensions of bacteria. Each of the cells is arranged so as to allow the development of bacteria under aerobic and anaerobic conditions.

The development of bacteria is effected in the presence of chemical reagents, (colored or not) at the same time as the thermal treatment. The reaction can then cause a change of color, or the appearance of color or turbidity in the mixture. The behavior of a bacteria is observed in the presence of a plurality of distinct chemical reagents at several times during the course of the heat treatment. For example, 100 distinct chemical reagents may be used and the behavior of the bacteria observed at three successive times.

One of the disadvantages of known heat treatment devices is that the cells, containing the suspension of bacteria and chemical reagents are at least partially open so as to allow the development of the bacteria in aerobic conditions. This causes the contents to evaporate and thus inevitable errors during the study of the growth of bacteria as well as during the bacteriological analysis. This is because the initial concentration of chemical reagents is not preserved.

SUMMARY OF THE INVENTION

The present invention is intended to provide an incubator in which this disadvantage is reduced.

According to the present invention, there is provided an incubator, suitable for the development of reactions in solutions which are contained in cells capable of being at least partially open, comprising at least one heating chamber defined between upper and lower heating plates so arranged that when in operation the upper plate of each chamber is maintained at a controlled temperature and the lower plate is maintained at a lower temperature.

Preferably, each chamber is divided into at least two thermally insulated compartments by vertical walls defining between them, on one face of each chamber, openings in which are inserted drawers for receiving the cells.

Preferably, there are also provided saturators for keeping the atmosphere in the compartment saturated, means for biasing each drawer to its closed position and means for ensuring a water-tight closure of the drawers.

BRIEF DESCRIPTION OF THE DRAWINGS

The present invention will be further described by way of example with reference to the accompanying drawings, in which:

FIG. 1 shows diagrammatically an incubator;

FIG. 2 shows a compartment of the incubator as seen from above;

FIG. 3 is an equivalent thermic diagram of a compartment of an incubator.

DESCRIPTION OF THE PREFERRED EMBODIMENT

In FIG. 1, the incubator comprises a plurality of identical chambers, one of which is denoted by the reference numeral 1 and has two horizontal partitions 2 and 3. The partitions form heating plates. The incubator has nine such chambers. Each of the plates 2 or 3 consists of an aluminum sheet provided with a snake-like conduit or a number of parallel conduits, through which a heating fluid flows. All the upper plates of the chambers are connected together in parallel and supplied with a first heating fluid, for example water, at a controlled first temperature. All the lower plates of the chambers are connected together in parallel and supplied with a second heating fluid, which may also be water, at a second temperature which is not controlled, but which is lower than that of the first heating fluid.

The circuit for the circulation of the water at a regulated temperature comprises a chamber 4 containing water, provided with a heating means in the form of an electrical resistance 41 and with a temperature regulator 42. The temperature of the water is for example regulated at 37° C. A first pipe 21 connects the chamber 4 to first ends of the upper plates such as plate 2. A centrifugal pump 43 in this pipe near the chamber 4 provides circulation of water in the direction of the arrow 44. A pipe 22 connects second ends of the upper plates to the chamber 4 so as to allow the water to return thereto.

In an analogous manner the circuit circulating the water around the lower plates has a water chamber 5 provided with heating means which keep the water in the chamber at a temperature lower than that of the water in the chamber 4. A pipe 31 and a centrifugal pump 53 carry the water from the chamber 5 towards the lower plates while another pipe 32 returns water to the chamber 5. The temperature of the water in the chamber 5 is not regulated but it is lower than that in the warm chamber 4, and is about 34° C.

Plates of cells containing suspensions of bacteria in the presence of chemical reagents are placed in drawers which are provided in the incubator. The drawers are not shown in FIG. 1 but are placed between the upper and lower plates. For example, an incubator having 45 drawers would have five drawers inserted in each of the nine spaces between an upper and lower plate. Each space is compartmented and each drawer is placed in a compartment insulated from other compartments in the same line. The general arrangement defines lines and columns of drawer compartments.

In FIG. 2, a drawer 6 is inserted between the upper plate and the lower plate, not shown, and two vertical walls 7 and 8. These define a compartment between the plates. This compartment is isolated from other adjacent compartments, the isolation avoiding the perturbation of adjacent compartments when an operator works on this first compartment.

The drawer 6 has a bottom with rims of small height. On the front side of the incubator, the rim is attached to a member 61, preferably thermally insulative, which extends along the length of the edge. The front face of the drawer consists of a small metal plate 62 extending along the member 61 and slightly projecting over each side of the member 61. A handle 63 fixed to the small plate 62 allows the drawer to be opened and closed as desired. The water-tightness of the drawer, when closed, is insured at each end of the small plate 62 by joints 65, 66 co-operating with parts of the compartment facing the vertical walls 7 and 8. These joints are made of a layer of elastic material, for example rubber, and are attached to the portions of the rear face of the small plate 62 which face the vertical walls 7 and 8. These vertical walls have respective projecting portions 71 and 81 in respective recesses 72 and 82, the remaining portions 73, 83 being in line with the front face of the drawer when it is completely inserted in the compartment.

Furthermore, in order to insure a better water-tightness of the drawer, the drawer is continuously urged into its closed position by two small wheels 91 and 92, which move along respective slopes 74 and 84 which are formed by giving a suitable profile to a part of the interior face of each vertical section 7 or 8. The small wheels 91 and 92 are carried by respective arms 93 and 94. Each arm is pivoted at a point intermediate its ends to the bottom of the drawers, at 95, 96 and the free ends have a spring 9 fixed between them. When the drawer is pulled out, the spring 9 is compressed thus tending to encourage the drawer to return to the inserted position in the compartment. Furthermore, complete withdrawal of the drawer when opened is resisted by abutment of the small wheels against abutments (not shown) positioned on the side faces of the compartment.

The bottom of the drawer is also provided with an opening 69 near the front face of the drawer. This opening allows an operator to manually guide the plates of cells when they are being inserted in or removed from the drawer.

Each drawer and/or compartment is provided with a saturator to insure humidity saturation of the atmosphere inside the compartment. The saturator comprises a sheet of absorbent material impregnated with water. The material is a kind of blotting paper. The paper can be placed either on the bottom of the drawer, or preferably on the edges of the drawers (not shown in FIG. 2). This saturation helps to avoid the evaporation, which occurs in a dry atmosphere, of the contents of the cells.

FIG. 3 shows the equivalent thermic diagram in a compartment of the incubator. The warm source (or upper plate 2) is isothermal at a controlled temperature $T_o$. The cold source (or lower plate 3) is at an uncontrolled temperature T. The exchange of heat between these two sources in the absence of plates of cells will be proportional to the difference between their temperatures and may be written $k(T_o - T)$, where k is the coefficient of proportionality. The heat loss from the interior of the compartment to the exterior, depending on the coefficient of conduction and the thickness of the insulation of the lateral surfaces and the coldness of the cold source, is proportional to the difference in temperature between the cold source and the temperature of the surrounding atmosphere 10. That is, the heat loss may be written $h(T - T_a)$ where h is the coefficient of proportionality and $T_a$ is the ambient temperature.

During a time interval dt, the heat flux delivered by the warm source warms up the thermic mass M of the cold source by an amount dT and thus compensates for the heat loss to the surroundings.

An equilibrium between the upper plate and the lower plate, on account of the heat losses, is quickly established and dT is then zero. The cold source has a constant temperature equal to $(kT_o + hT_a/k + h)$, and the difference $\Delta T$ between the warm source and the cold source is $$\Delta T = (h/k + h)(T_o - T_a).$$

The heat flux of the warm source towards the cold source is then equal to the loss to the exterior which may equal to $(hk/h + k)(T_o - T_a)$.

It is the temperature gradient of the warm source to the cold source which avoids the evaporation that may take place in the cells. Furthermore, the temperature gradient between the top and bottom of each compartment avoids the formation of droplets on the cells. The cells at the ambient temperature, 20° for example, are introduced into a drawer where the water of saturation is at an intermediate temperature between the temperatures of the upper and lower plates, 34° for example. There is immediately condensation on the cells, condensation that must be removed for subsequent photometric measurements.

The water of condensation is, like the plate of cells, warmed, and the temperature gradient applied from top to bottom so that in practice the water falls towards the lower part of the drawer and leaves the plate.

To avoid the collection of droplets on the bottoms of the cells, owing to the heterogenity of distribution of the thermic mass of the plate which causes a slower reheating under the cells and between the cells, the saturators are preferably placed on each side of the drawers and not on the bottom of the incubator underneath the plates.

What is claimed is:

1. An incubator, suitable for the development of reactions in solutions which are contained in cells that are capable of being at least partially open, said incubator comprising:
    at least one heating chamber defined by upper and lower heating plates,
    means for maintaining the upper plate of said chamber at a controlled temperature and the lower plate at a lower temperature,
    vertical walls dividing said chamber into thermally insulated compartments,
    means defining openings between said walls on the face of said chamber, and
    insertable drawers positioned within said openings for containing said cells.

2. The incubator according to claim 1, wherein each plate is provided with a tube for circulation of a heating fluid to thereby control its temperature.

3. The incubator according to claim 2, wherein a plurality of alternate upper and lower plates define a plurality of vertically aligned chambers and wherein the upper plates of the chambers are connected together in parallel and are supplied with a first heating fluid at a controlled temperature, and the lower plates of the chambers are connected together in parallel and are supplied with a second heating fluid at a temperature lower than that of the first heating fluid.

4. The incubator according to claim 1, further comprising humidity saturators for the drawers to keep the atmosphere in each compartment saturated.

5. The incubator according to claim 3, further comprising humidity saturators for the drawers to keep the atmosphere in each compartment saturated.

6. The incubator according to claim 4, wherein the saturator comprises a respective piece of water-absorbent material impregnated with water and disposed on the bottom of each drawer.

7. The incubator according to claim 4, wherein the saturator comprises a respective piece of water-absorbent material saturated with water and disposed at the edges of each drawer.

8. The incubator according to claim 1, wherein each drawer has a plate arranged to seal the opening of the corresponding compartment, the plate having a portion of a flexible and deformable material which cooperates with each of the edges of the opening to insure water-tight closure of the drawer.

9. The incubator according to claim 4, wherein each drawer has a plate arranged to seal the opening of the corresponding compartment, the plate having a portion of a flexible and deformable material which cooperates with each of the edges of the opening to insure water-tight closure of the drawer.

10. The incubator according to claim 8, wherein the edges of the opening include a projecting portion arranged to compress the flexible and deformable portion of the plate.

11. The incubator according to claim 1, wherein each drawer is provided with a means for biasing the drawer to its closed position.

12. The incubator according to claim 8, wherein each drawer is provided with a means for biasing the drawer to its closed position.

13. The incubator according to claim 11, wherein the bias means include two wheels which run on respective tracks, each wheel being attached to a first end of a respective lever arm which is pivoted intermediate its ends to a point on the rear part of the drawer, second ends of the arms being connected by a spring.

14. The incubator according to claim 1, wherein the bottom of each drawer is provided adjacent its front with an opening allowing manipulation of the cells in the drawer.

* * * * *